United States Patent [19]

Glenn et al.

[11] 4,368,645

[45] Jan. 18, 1983

[54] OPTICAL PRESSURE SENSOR

[75] Inventors: William H. Glenn, Vernon; Richard G. Tomlinson, Glastonbury, both of Conn.

[73] Assignee: United Technologies Corporation, Hartford, Conn.

[21] Appl. No.: 191,193

[22] Filed: Sep. 26, 1980

[51] Int. Cl.³ .............................................. G01L 9/00
[52] U.S. Cl. ...................................... 73/705; 73/730; 356/33
[58] Field of Search ............ 73/705, 730, 800, 862.64, 73/862.38, 119 A; 356/33

[56] References Cited

U.S. PATENT DOCUMENTS

| | | | |
|---|---|---|---|
| 3,786,681 | 1/1974 | Kiehn | 73/382 R |
| 3,950,987 | 4/1976 | Slezinger et al. | 73/705 |
| 4,010,632 | 3/1977 | Slezinger et al. | 73/800 |
| 4,155,256 | 5/1979 | Lautzenhiser | 73/862.38 |
| 4,171,908 | 10/1979 | Robert et al. | 73/800 |
| 4,270,050 | 5/1981 | Brogardh | 73/800 |

FOREIGN PATENT DOCUMENTS 567964  9/1977  U.S.S.R. ................................ 73/800

*Primary Examiner*—Donald O. Woodiel
*Attorney, Agent, or Firm*—Eric W. Petraske

[57] ABSTRACT

A system for sensing pressure features an electrically passive sensing head connected to electrically active components by a fiber optic cable. A preferred embodiment combines a polariscope bracketing a quarter wave plate and a photoelastic medium. The dependence of the intensities of two polarization components of light emerging from the photoelastic medium on the pressure applied to the medium permits the measurement of that pressure in a manner that has quadratic error dependence on optical misalignment.

5 Claims, 3 Drawing Figures

OPTICAL PRESSURE SENSOR

TECHNICAL FIELD

The field of the invention is the measurement of pressure by means of a nonelectrical sensor employing fiber optic light transmission.

BACKGROUND ART

Fiber optic sensors, where the fiber is used either as a sensing device or as a transmission medium in connection with an optical sensor, have the advantage that the sensing element is electrically passive so that such devices are suitable for explosive atmospheres, electrically noisy environments or in other situations where heat and/or vibration impede the operation of electrical components.

U.S. Pat. Nos. 4,010,632 and 3,950,987, issued to Slezinger et al., disclose a photoelastic pressure sensor having two physically separate optical channels having a birefringent plate used for phase-shifting a linearly polarized beam by the same amount in opposite directions, illustratively $\pm \pi/2$.

DISCLOSURE OF INVENTION

The invention relates to a pressure measurement system having a nonelectric sensing head in which polarization components of a light beam are differentially affected by pressure applied to a photoelastic medium. A particular embodiment of the invention has quadratic error dependence on optical misalignment.

BEST MODE FOR CARRYING OUT THE INVENTION

Figure 1:
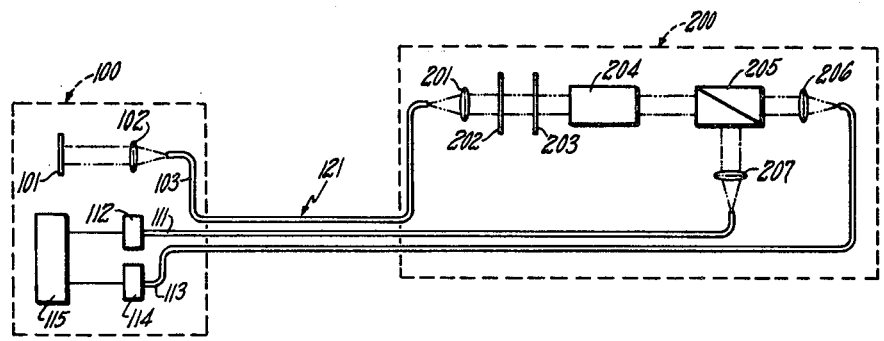
FIG. 1 shows a simple embodiment of the invention.

In FIG. 1, a pressure measurement system includes electrical unit 100, containing a light source and detectors, optical sensing head 200 and fiber optic cable 121 connecting them. In operation, light source 101, illustratively a light-emitting diode generates light which is focused by lens 102 into fiber 103, which is one component of cable 121. In sensing head 200, the light from fiber 103 is collimated by lens 201 and linearly polarized in polarizer 202. Linearly polarized light emerging from polarizer 202 is circularly polarized in quarter wave plate 203. For convenience, elements 202 and 203 may be bonded together in correct alignment (with their axes at 45°), after which the orientation of the two elements with respect to the other components does not matter. Circularly polarized light enters photoelastic medium 204, which may be any material having a stress-optical coefficient of a magnitude appropriate for the pressure range of interest. This constant has been measured for many materials, a convenient source of measured values being "Photoelastic Stress Analysis", by A. Kuske and G. Roberston, published by John Wiley and Sons, New York, 1974. Photoelastic materials, when under stress, have different indices of refraction along axes parallel and perpendicular to the direction of applied force. For forces applied to a photoelectric medium along two axes, X and Y, oriented perpendicular to the direction of light transmission, the index of refraction will be different along the X and Y axes and the difference is related to the applied pressure by $$n_x - n_y = C(P_x - P_y),$$

where $n_x$ and $n_y$ are the indices of refraction along the two axes, $P_x$ and $P_y$ are the applied pressures and C is the stress-optical coefficient. If one pressure is that of the atmosphere, then the index difference will be a measure of the gauge pressure on the other axis. If a vacuum is produced around the medium, then the absolute pressure will be measured. It can be shown that the intensity of light traversing polarizer 202, medium 204 and prism 205 along the X and Y axes is $$I_x = I_o \cos^2 \theta \qquad (1)$$

$$I_y = I_o \sin^2 \theta$$

$$\text{where } \theta = \frac{\pi l C}{\lambda} (P_x - P_y)$$

where l is the length of the medium along the beam and $\lambda$ is the wavelength of the light. The effect of quarter wave plate 203 will be discussed below.

Measurement of the light intensity of the two components may be accomplished by passing the emergent light from medium 204 through Glan-Thompson prism 205, which deflects one component through lens 207 into fiber 111 and permits the other component to pass through lens 206 and into fiber 113. These two components are measured in detectors 112 and 114 and the detector outputs are processed in circuits 115, which may be a microcomputer or a collection of logic circuits.

Figure 2:
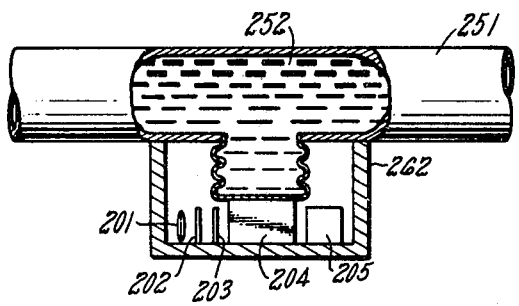
FIG. 2 shows a detail of the application of pressure to a sensitive element.
Figure 3:
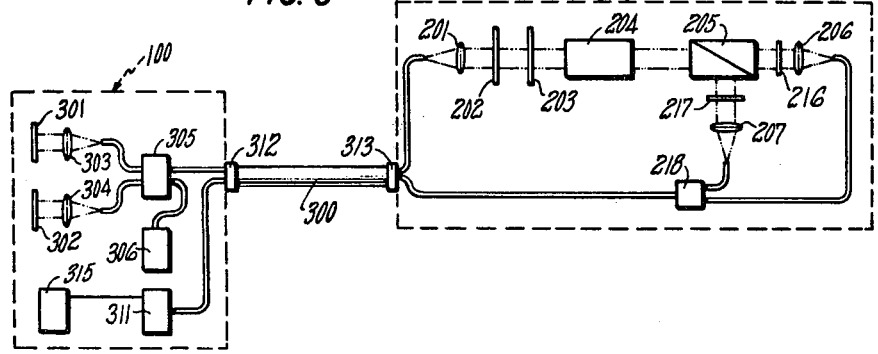
FIG. 3 shows a more complex embodiment of the invention which permits the use of connectors in the optical cable.

FIG. 2 shows in more detail a suitable mounting for the case in which absolute pressure of a fluid is measured. Other embodiments may be easily devised for the measurement of gas or mechanical pressure. Pipe 251 encloses fluid 252, the pressure of which is to be measured. Bellows 261 having a flat bottom pressing against block 204 permits the contraction of block 204 in response to the pressure. Mounting chamber 262 supports block 204 against the pressure and also supports the other components. Mounting chamber 262 is evacuated so that the reference pressure perpendicular to the applied pressure is zero. The optical fibers enter and exit chamber 262 through appropriate feedthrough devices that are not shown. The surface of mounting 262 serves as an alignment reference. For convenience in alignment, bellows 261 should be constructed so that the fluid pressure is directed along an axis perpendicular to the surface of mounting 262, thus defining the principal stress axis of the device. Prism 205 then is mounted on the same surface with its axis at forty five degrees with respect to the stress axis. Conventionally, the stress axis is penpendicular to the direction of travel of the light beam, so that orthogonal coordinates may be used.

Because the block 204 responds to the difference between the pressures applied to the two axes, it is naturally suited to measure differential pressure. In such a case, the detail in FIG. 2 would be modified so that block 204 would be braced in two directions and a second pressure applied to sensor block 204 through a second bellows oriented at a right angle with respect to bellows 261. In this case, mounting chamber would not be evacuated. If desired, an equivalent, mechanically simpler, arrangement would be to move polarization analyzing prism 205 further away from block 204 and to insert a second block 204′ between block 204 and prism 205. The transmitted light in this arrangement would be unchanged from the previous embodiment. The orientation of the second stress axis would still be at a right angle with respect to the axis along which bellows 261 applies force. In some applications, it may be desirable to measure the sum of two pressures, in which case support 262 would be modified by making an opening so that force could be applied to the face of block 204 opposite to that upon which bellows 261 presses.

It will be shown below that the output of the device depends on a calibration constant K that, in turn, depends on the length l of block 204 and the constant C characteristic of the material so that the sensitivity of the device may be modified by choice of length and materials.

The relation of equation 1, which applies to the two components of linearly polarized input light may be used for measurement purposes, but it is not convenient. Considerable improvement is obtained by the insertion of quarter wave plate 203, which has the effect of biasing $\theta$ by $\pi/4$ and thus changing the dependence of light intensity to:

$$S_1 = I'_x = \frac{I_o}{2}(1 - \sin 2\theta) \quad (2)$$

$$S_2 = I'_y = \frac{I_o}{2}(1 - \sin 2\theta)$$

where $S_1$ and $S_2$ are the new values for the X and Y light intensities. $S_1$ and $S_2$ may be further combined in circuits 115 to form the quantity $$S = \frac{S_1 - S_2}{S_1 + S_2} = -\sin 2\theta = \sin(KP) \quad (3)$$

where P is the difference in pressure along the two axes and K is effectively a calibration constant. S will be periodic in $\theta$ and have an unambiguous range for $-\pi/4 < \theta < \pi/4$. In the particular case of a glass medium having C=2200 lb.f./in.fr. and a length of one inch the pressure range is ±550 psig. The use of quarter wave plate 203 not only has the beneficial effect of making the alignment of polarizer 202 relative to medium 204 unimportant, as was mentioned above, but the combination S is independent of the input intensity and is only quadratically dependent on optical misalignment of the components, a considerable factor in reducing the cost of a device since extra care in alignment is directly reflected in the cost of manufacture.

In the foregoing embodiment, the quarter wave plate was used to shift the two response functions in such a manner that the range is equal for positive or negative pressures. If only positive (or negative) pressures are to be measured, for example, a different thickness of birefringent element may be used to introduce a convenient phase retardation between two polarization components.

The basic angular reference for the system is the direction along which force is applied to photoelastic block 204. Prism 205 must be oriented at forty five degrees to this direction and errors in this alignment will show up as errors in the two intensity components. Errors in the alignment of polarizer 202 with respect to quarter wave plate 203 will have a similar effect. Errors in the dimension of block 204 or its orientation will have the effect of changing the length l of 204 and changing the calibration constant K, but such errors affect both intensities equally and may be corrected for by calibration.

The embodiment of FIG. 1 has the limitation that the fiber optic cable be continuous, for if connectors are employed, the light transmission along fibers 111 and 113 will change every time the connection is broken and remade. This restriction is a serious inconvenience in many applications and may be corrected for in various ways. One method would be to include calibration by adding to circuits 115 the option of measuring the two intensities at zero pressure and then correcting the measured readings by the appropriate amount.

A more convenient approach is illustrated in FIG. 2, in which two light emitting diodes 301 and 302 generate light at wavelengths $\lambda_1$ and $\lambda_2$, respectively. This light is focused by lenses 303 and 304 into short fibers which transmit the light to a commercially available optical coupler 305, having two outputs. One output goes to detector 306 for monitoring, since the input intensity will now not be common to both polarization components. The other output, carrying incident light of both frequencies, travels through connector 312, along cable 307, through connector 313 to lens 201.

Optical components 201 through 205 of the sensing head function as they did in the embodiment of FIG. 1. At the output of prism 205, however, filters 216 and 217 permit the passage of only light of wavelength $\lambda_1$ and $\lambda_2$, respectively, which is focused by lenses 206 and 207 into fibers as before. The two beams of different wavelength are combined in coupler 218 and returned to detector 311 and processing circuits 315. Circuits 315 differ from circuits 115 of the previous embodiment in that they also control the timing of sources 301, 302 and detectors 306 and 311 so that light of the two wavelengths is transmitted through the system in alternation and the measurements from the detectors at the first frequency are stored and then combined with the corresponding measurements at the second frequency to form the result.

Although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. An apparatus for pressure measurement comprising:
    a photoelastic medium responsive to external pressure;
    means for directing a single beam of light along an optic axis through said photoelastic medium from an upbeam side of said photoelastic medium to a downbeam side;
    a polarizing means mounted along said optic axis upbeam of said photoelastic medium and oriented with a predetermined polarization axis perpendicular to said optic axis;
    a birefringent plate mounted along said optic axis intermediate said photoelastic medium and said polarizing means and having a plate axis perpendicular to said optic axis and oriented at forty five degrees with respect to said polarization axis;

a polarization analyzer, mounted along said beam axis downbeam of said photoelastic medium for resolving first and second polarization components of light contained in said beam emerging from photoelastic medium;

means for transporting said two polarization components of light to remote measurement means;

means for measuring the intensities of said two polarization components; and means for combining said two measured intensities in a predetermined manner to form a measurement of external pressure applied to said photoelastic medium.

2. An apparatus according to claim 1 in which said means for directing a beam of light and said means for transporting polarization components further comprise optical fibers.

3. An apparatus according to claim 2, in which said birefringent plate is a quarter wave plate.

4. An apparatus according to claim 2 or 3, in which each of said optical fibers has an optical fiber connection in which said means for directing a beam of light further comprises means for generating a beam of light having at least first and second wavelengths and said means for transporting polarization components further comprises means for separating said first polarization component at said first wavelength, for separating said second polarization component at said second wavelength and means for combining said first and second separated polarization components in a single optical fiber.

5. An apparatus for pressure measurements comprising:

a photoelastic medium responsive to external pressure;

means for directing a single beam of circularly polarized light along an optic axis through said photoelastic medium;

a polarization analyzer, mounted along said optic axis, for separating two linearly polarized components (polarization components) of light emerging from said photoelastic medium;

means for measuring the intensities of said two polarization components; and means for combining said two measured intensities in a predetermined manner to form a measurement of said external pressure.

* * * * *